United States Patent [19]

Iio

[11] Patent Number: 5,260,385
[45] Date of Patent: Nov. 9, 1993

[54] BIGUANIDE GROUP-CONTAINING POLYALLYLAMINE AND METHOD OF PRODUCING SAME

[75] Inventor: Kokoro Iio, Ushiku, Japan

[73] Assignee: Director-General of Agency of Industrial Science and Technology, Japan

[21] Appl. No.: 969,968

[22] Filed: Nov. 2, 1992

[51] Int. Cl.$^5$ .............................................. C08F 8/00
[52] U.S. Cl. ................... 525/328.2; 525/377; 526/310
[58] Field of Search .......................... 525/328.2, 377; 526/310

[56] References Cited

U.S. PATENT DOCUMENTS 4,604,451 8/1986 Harada et al. ................... 525/328.2
4,891,423 1/1990 Stockel ............................... 524/612

Primary Examiner—Harold D. Anderson
Attorney, Agent, or Firm—Lorusso & Loud

[57] ABSTRACT

A biguanide group-containing polymer having repeat units of the following general formula (I):

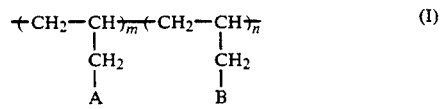

wherein
A represents a radical selected from the group consisting of

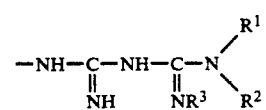

where $R^1$, $R^2$ and $R^3$ independently from each other represent a hydrogen atom, an alkyl group having 1-18 carbon atoms, an alkoxycarbonylalkylene group having 3-18 carbon atoms, an alkylenecarboxylic acid group having 2-18 carbon atoms or an aryl group having 6-8 carbon atoms, and

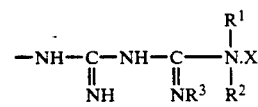

where $R^1$, $R^2$ and $R^3$ have the same meaning as above and X represents an acid,
B represents a radical selected from the group consisting of $-NH_2$ and $-NH_2$ Y where Y represents an acid, and m and n independently from each other are integers of 1 or more with proviso that (m+n) is 10 or more.

The polymer may be prepared by reacting polyallylamine with a guanyl-O-alkylisourea compound to convert a portion of the amino groups of the polyallylamine to biguanido groups.

4 Claims, 1 Drawing Sheet

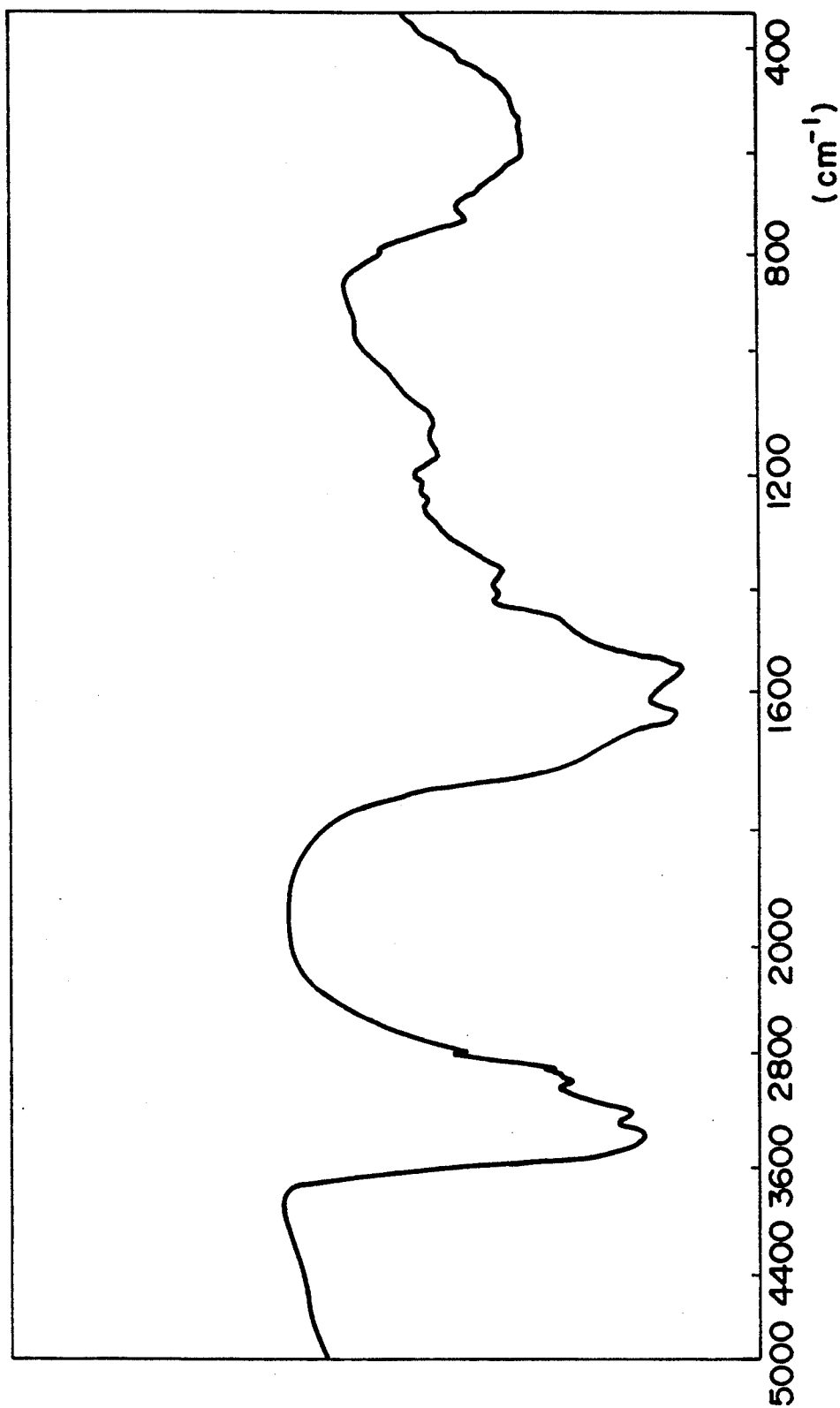

BIGUANIDE GROUP-CONTAINING POLYALLYLAMINE AND METHOD OF PRODUCING SAME

BACKGROUND OF THE INVENTION

This invention relates a novel, biguanide group-containing polymer and a method of producing same.

Alkylbiguanide compounds are known to exhibit germicidal and antimicrobial activities. For the purpose of improving the activity, stability and safety of such biguanide compounds, there are proposals to provide polymers containing a multiplicity of biguanide groups.

For example, Japanese Published Unexamined Patent Application No. 59-196303 discloses an antimicrobial polymer obtained by polymerization of biguanide group-containing acrylate. This polymer, however, has a problem because biguanide group-containing moieties are apt to be released from the polymer skeleton by hydrolysis of the ester linkages.

SUMMARY OF THE INVENTION

It is, therefore, an object of the present invention to provide a novel, stable, biguanide group-containing polymer having good resistance to hydrolysis and to heat and exhibiting high activities inherent to the biguanide groups.

Another object of the present invention is to provide a method for the preparation of the above polymer.

In accordance with the present invention there is provided a polymer having repeat units of the following general formula (I):

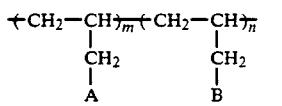

wherein

A represents a radical selected from the group consisting of

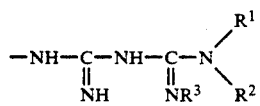

where $R^1$, $R^2$ and $R^3$ independently from each other represent a hydrogen atom, an alkyl group having 1–18 carbon atoms, an alkoxycarbonylalkylene group having 3–18 carbon atoms, an alkylenecarboxylic acid group having 2–18 carbon atoms or an aryl group having 6–8 carbon atoms, and

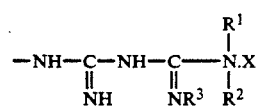

where $R^1$, $R^2$ and $R^3$ have the same meaning as above and X represents an acid, B represents a radical selected from the group consisting of —$NH_2$ and —$NH_2$ Y where Y represents an acid, and m and n independently from each other are integers of 1 or more with the proviso that (m+n) is 10 or more.

The present invention also provides a method of preparing a polymer, comprising the steps of:

providing a polyallylamine having repeat units of the following general formula (II):

wherein p is an integer of at least 10;

reacting said polyallylamine with a compound having the following general formula (III):

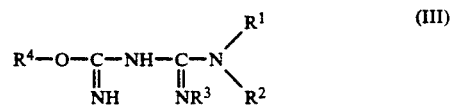

where $R^1$, $R^2$ and $R^3$ independently from each other represent a hydrogen atom, an alkyl group having 1–18 carbon atoms, an alkoxycarbonylalkylene group having 3–18 carbon atoms, an alkylenecarboxylic acid group having 2–18 carbon atoms or an aryl group having 6–8 carbon atoms and $R^4$ represents an alkyl group having 1–5 carbon atoms, or a salt of said compound with an acid X to obtain a biguanide group-containing polymer having repeat units of the general formula (Ia):

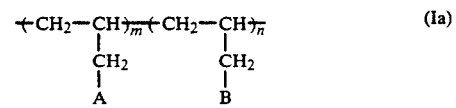

wherein

A represents a radical selected from the group consisting of

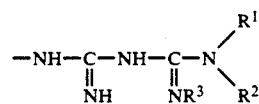

and

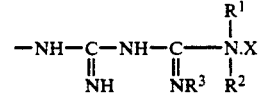

where $R^1$, $R^2$, $R^3$ and X have the same meaning as above,

B represents an amino group —$NH_2$, and m and n independently from each other are integers of 1 or more with the proviso that (m+n) is equal to p.

If desired the biguanide group-containing polymer of the formula (Ia) is further reacted with an acid Y, as above, to convert the amino group —$NH_2$ of B to —$NH_2 \cdot Y$.

The reaction of the compounds of the formulas (II) and (III) may be preferably performed at a temperature of 20°–60° C. for 0.5–100 hours using a suitable solvent such as methanol or water.

In the above general formulas, $R^1$, $R^2$ and $R^3$ may be the same or different and each stands, for example, for a hydrogen atom, a methyl group, an ethyl group, a propyl group, a hexyl group, a dodecyl group, a stearyl group, a methoxycarbonylmethylene group, an ethoxycarbonylmethylene group, a methylenecarboxylic acid group, a phenyl group, a tolyl group or a xylyl group, and X and Y may be same or different and each stands, for example, for hydrogen chloride, hydrogen bromide, hydrogen iodide, sulfuric acid, methyl bisulfate, phosphoric acid or p-toluenesulfonic acid. Preferably, (m+n) is 10–5,000, more preferably 50–1,000. The ratio of m/n is preferably at least 10:90, more preferably at least 30:70, most preferably at least 50:50.

The biguanide group-containing polymer may be utilized for various applications such as a germicide, an algicide, an antiseptic, an antimicrobial agent, a medicine, a fiber treating agent, a paper treating agent, a coagulant, an antistatic agent and an adjuvant for shampoo or detergent.

BRIEF DESCRIPTION OF THE DRAWINGS

Other objects, features and advantages of the present invention will become apparent from the detailed description of the preferred embodiments of the invention which follows, when considered in light of the accompanying drawing, in which: the sole FIGURE is an infra-red spectrum of a biguanide group-containing polymer according to the present invention.

DETAILED DESCRIPTION OF THE PREFERRED EMBODIMENTS OF THE INVENTION

The following examples will further illustrate the present invention.

EXAMPLE 1

Polyallylamine hydrochloride (0.98 g (0.01 mol calculated in terms of one monomer unit provided that the water content is 5% by weight)) having a weight average molecular weight of 7,500–11,000 was mixed with 100 ml of a methanol solution containing 0.011 mol of sodium methoxide and the mixture was stirred at 45° C. for 4 hours, so that the polyallylamine hydrochloride was dissolved as free polyallylamine with the simultaneous formation of NaCl as precipitates. The precipitates were removed by filtration. The filtrate was mixed with 1.55 g (0.01 mol) of guanyl-O-methylisourea hydrochloride and the mixture was reacted at 45°–50° C. for 19 hours in the atmosphere of nitrogen. The reaction solution was then acidified to pH 4 with dilute hydrochloric acid and was poured into acetone to precipitate a biguanide group-containing polymer product having about 60% of substitution degree (m:n in the above formula (I) is about 6:4). The elementary analysis revealed: C: 35.21%, H:7.66%; N:28.9%, Cl:21.39%. The IR spectrum of the product is shown in the FIGURE.

EXAMPLE 2

Polyallylamine hydrochloride (4.83 g (0.05 mol calculated in terms of one monomer unit provided that the water content is 5% by weight)) having a weight average molecular weight of 7,500–11,000 was dissolved in 50 ml of water and then treated with an ion exchange resin IRA-402 to obtain an aqueous solution containing free polyallylamine. This solution was reacted with 7.63 g (0.05 mol) of guanyl-O-methylisourea hydrochloride at 35° C. for 48 hours in the atmosphere of nitrogen. The reaction solution was then treated in the same manner as that in Example 1 to obtain a biguanide group-containing polymer product having a substitution degree of about 39%.

EXAMPLE 3

Polyallylamine hydrochloride (4.83 g (0.05 mol calculated in terms of one monomer unit provided that the water content is 5% by weight)) having a weight average molecular weight of 7,500–11,000 was treated with an aqueous sodium hydroxide (1N) solution to obtain an aqueous solution containing free polyallylamine. This solution was reacted with 7.63 g (0.05 mol) of guanyl-O-methylisourea hydrochloride at 35° C. for 20 hours in the atmosphere of nitrogen. The reaction solution was then treated in the same manner as that in Example 1 to obtain a biguanide group-containing polymer product having a substitution degree of about 19%.

EXAMPLE 4

Polyallylamine hydrochloride (4.78 mg (0.049 mmol calculated in terms of one monomer unit provided that the water content is 5% by weight)) having a weight average molecular weight of 50,000–65,000 was treated in the same manner as that in Example 1 to obtain an aqueous solution containing free polyallylamine. This solution was reacted with 11.44 mg (0.075 mmol) of guanyl-O-methylisourea hydrochloride at 25° C. for 24 hours in the atmosphere of nitrogen. The reaction solution was then treated in the same manner as that in Example 1 to obtain a biguanide group-containing polymer product having a substitution degree of about 31%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A polymer having repeat units of the following general formula (I):

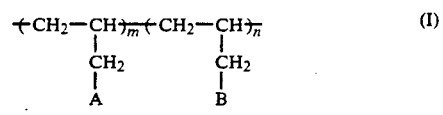

wherein

A represents a radical selected from the group consisting of

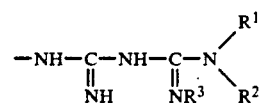

where $R^1$, $R^2$ and $R^3$ independently from each other represent a hydrogen atom, an alkyl group having 1–18 carbon atoms, an alkoxycarbonylalkylene group having 3–18 carbon atoms, an alkylenecarboxylic acid group having 2–18 carbon atoms or an aryl group having 6–8 carbon atoms, and

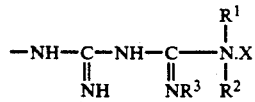

where $R^1$, $R^2$ and $R^3$ have the same meaning as above and X represents an acid, B represents a radical selected from the group consisting of —$NH_2$ and —$NY_2 \cdot Y$ where Y represents an acid, and m and n independently from each other are integers of 1 or more with the proviso that (m+n) is 10 or more.

2. The polymer as claimed in claim 1, wherein $R^1$, $R^2$ and $R^3$ independently from each other represent a hydrogen atom, a methyl group, an ethyl group, a propyl group, a hexyl group, a dodecyl group, a stearyl group, a methoxycarbonylmethylene group, an ethoxycarbonylmethylene group, a methylenecarboxylic acid group, a phenyl group, a tolyl group or a xylyl group, X and Y independently from each other represent hydrogen chloride, hydrogen bromide, hydrogen iodide, sulfuric acid, methyl bisulfate, phosphoric acid or p-toluenesulfonic acid, and (m+n) is 10–5,000.

3. A method of preparing a polymer, comprising the steps of:

reacting a polyallylamine having repeat units of the following general formula (II):

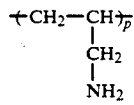

wherein p is an integer of at least 10;
with a compound having the following general formula (III):

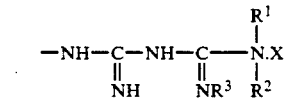

where $R^1$, $R^2$ and $R^3$ independently from each other represent a hydrogen atom, an alkyl group having 1–18 carbon atoms, an alkoxycarbonylalkylene group having 3–18 carbon atoms, an alkylenecarboxylic acid group having 2–18 carbon atoms or an aryl group having 6–8 carbon atoms and $R^4$ represents an alkyl group having 1–5 carbon atoms, or a salt of said compound with an acid X to obtain a biguanide group-containing polymer having repeat units of the general formula (I):

$$\begin{array}{c} \text{(CH}_2\text{—CH)}_m\text{(CH}_2\text{—CH)}_n \\ | \quad\quad\quad | \\ \text{CH}_2 \quad\quad \text{CH}_2 \\ | \quad\quad\quad | \\ \text{A} \quad\quad\quad \text{B} \end{array} \quad\quad (I)$$

wherein
A represents a radical selected from the group consisting of

—NH—C—NH—C—N$\diagup^{R^1}_{\diagdown R^2}$
  ||  || |
  NH  NR$^3$ and

—NH—C—NH—C——N.X
  ||  || | |
  NH  NR$^3$ R$^2$ where $R^1$, $R^2$, $R^3$ and X have the same meaning as above, B represents an amino group —$NH_2$, and m and n independently from each other are integers of 1 or more with the proviso that (m+n) is equal to p.

4. A method as claimed in claim 3, further comprising reacting said biguanide group-containing polymer with an acid Y to convert said amino group —$NH_2$ to —$NH_2 \cdot Y$.

* * * * *